United States Patent [19]
Aubin

[11] Patent Number: 5,860,670
[45] Date of Patent: Jan. 19, 1999

[54] TRAILER TOWING DEVICE

[76] Inventor: Francis L. Aubin, 5073 Gettysburg Ave., Chino, Calif. 91710

[21] Appl. No.: 637,510

[22] Filed: Apr. 25, 1996

[51] Int. Cl.$^6$ ............................................. B60D 7/00
[52] U.S. Cl. ................................................ 280/476.1
[58] Field of Search ....................... 280/415.1, 418.1, 280/420, 476.1, 767, 63; 224/42.12, 42.24, 519

[56] References Cited

U.S. PATENT DOCUMENTS

| | | | |
|---|---|---|---|
| 2,500,686 | 3/1950 | Jontz | 280/476.1 |
| 2,506,718 | 5/1950 | Grant | 280/476.1 |
| 2,515,705 | 7/1950 | Gardiner | 280/476.1 |
| 2,639,159 | 5/1953 | Milligan et al. | 280/476.1 |
| 3,281,761 | 10/1966 | Anderson | 280/476.1 |
| 3,979,137 | 9/1976 | Lipscomb, Jr. et al. | 280/402 |
| 4,032,167 | 6/1977 | Chereda | 280/400 |
| 4,253,679 | 3/1981 | Sargent | 280/476.1 |
| 4,917,402 | 4/1990 | Reynolds et al. | 280/63 |
| 5,387,001 | 2/1995 | Hull et al. | 280/415.1 |
| 5,645,292 | 7/1997 | McWilliams et al. | 280/63 |

FOREIGN PATENT DOCUMENTS

| | | | |
|---|---|---|---|
| 0164672 | 8/1955 | Australia | 280/476.1 |
| 0215401 | 6/1958 | Australia | 280/476.1 |
| 0615607 | 1/1949 | United Kingdom | 280/476.1 |
| 0664799 | 1/1952 | United Kingdom | 280/476.1 |
| 3025428 | 12/1993 | WIPO | 280/476.1 |

*Primary Examiner*—Randolph A. Reese
*Assistant Examiner*—John L. Beres

[57] ABSTRACT

A trailer towing device including an axial tow bar that has a front end, a rear end and top portion with a plurality of apertures. A socket hitch is coupled to the front end of the tow bar, and has a tow ball gripping catch for securing the socket hitch to a tow ball of a vehicle bumper. An cross member is attached to the rear end of the tow bar. A traverse axle is in contact with the inner surface and within the channel of the cross member. The traverse axle has a pair of axle adaptors fixedly attached to the top thereof. The traverse axle supports the tires. A reinforcing plate is attached to the upper surface of the cross member, and has a junction box and a hitch ball head post. Lastly, a pair of gusset bars, with one end of each gusset bar fixedly attached to the tow bar, while another end of each gusset bar is fixedly attached to the cross member. The pair of gusset bars provide axial rigidity between the tow bar and the cross member, when the traverse axle is within the cross member.

1 Claim, 3 Drawing Sheets

TRAILER TOWING DEVICE

BACKGROUND OF THE INVENTION

1. Field of the Invention

The present invention relates to a trailer towing device and more particularly pertains to providing a device capable of reducing the trailer tongue weight that is applied to a vehicle bumper when a trailer hitch is coupled to the bumper for towing by the vehicle.

2. Description of the Prior Art

The use of a towing trailer is known in the prior art. More specifically, towing trailers heretofore devised and utilized for the purpose of transporting objects in a trailer hitched to a towing vehicle are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,382,041 to Keith discloses a method and apparatus for connecting a trailer and a rigid draw bar and at least one centrally positioned axle to a tow vehicle. U.S. Pat. No. 5,348,327 to Gieske discloses a collapsible manually towed or bicycle trailered sailboard dolly. U.S. Pat. Des. No. 322,948 to DeMichele and Patout discloses a wheel lifting towing dolly. U.S. Pat. No. 5,013,209 to DeMichele and Patout discloses a wheel lift towing dolly. U.S. Pat. No. 4,861,221 to Krisa discloses a vehicle lifting and towing attachment. Lastly, U.S. Pat. No. 4,323,328 to Walsh, III discloses a vehicle hoisting tow trailer.

While these devices fulfill their respective, particular objectives and requirements, the aforementioned patents do not describe trailer towing device that allows the swing of a trailer, normally transmitted to the towing vehicle, to be transmitted through the device operating as an intermediate trailer.

In this respect, the trailer towing device according to the present invention substantially departs from the conventional concepts and designs of the prior art, and in doing so provides an apparatus primarily developed for the purpose of providing a device capable of reducing the trailer tongue weight that is applied to a vehicle bumper when a trailer hitch is coupled to the bumper for towing by the vehicle.

Therefore, it can be appreciated that there exists a continuing need for a new and improved trailer towing device which can be used for providing a device capable of reducing the trailer tongue weight that is applied to a vehicle bumper when a trailer hitch is coupled to the bumper for towing by the vehicle. In this regard, the present invention substantially fulfills this need.

SUMMARY OF THE INVENTION

In view of the foregoing disadvantages inherent in the known types of towing trailers now present in the prior art, the present invention provides an improved trailer towing device. As such, the general purpose of the present invention, which will be described subsequently in greater detail, is to provide a new and improved trailer towing device and method.

To attain this, the present invention essentially comprises a rigid axial tow bar that has a front end, a rear end and top portion. The top portion has a plurality of apertures therethrough and mid-way the front end and the rear end. Included is a socket hitch that is capable of being bolted to the front end of the tow bar. The socket hitch has a tow ball gripping catch and a chain. The socket hitch is attached to a tow ball of a vehicle bumper, while the chain is coupled to the bumper's bottom. The catch is capable of securing the socket hitch onto the tow ball of the vehicle. Included is a deep channel cross member that is fixedly attached to the rear end of the tow bar. The cross member has an upper surface and an inner surface. The cross member has end edges with a plurality of holes punched therethrough and adjacent the edges. The plurality of holes form groups of five holes that are along each end edge of the cross member. The cross member has a reinforcing plate that is fixedly attached to the upper surface thereof, and the top portion of the tow bar simultaneously. Also, the reinforcing plate has a junction box and a hitch ball head post mounted thereon. The junction box is capable of coupling with the power source of the vehicle when the socket hitch is positioned on the vehicle bumper. The junction box transfers power from the vehicle to a trailer mounted onto the hitch ball of the cross member. Additionally, a traverse axle is in contact with the inner surface and within the channel of the cross member. The traverse axle has a pair of axle adaptors fixedly attached to the top thereof. Each axle adaptor is capable of securing the traverse axle within the cross member. The traverse axle is coupled to a hub and drum, the hub and drum support a tire. The idler hub has the brake drum bolted to it when brakes are used. Included are a pair of gusset bars. One end of each gusset bar is fixedly attached to the tow bar, while another end of each gusset bar is fixedly attached to the cross member. The pair of gusset bars provide axial rigidity between the tow bar and the cross member, when the traverse axle is bolted to the cross member. The axle rigidity allows the socket hitch to resist swaying, when mounted to the tow ball of the vehicle and the trailer is mounted to the hitch ball. The axial rigidity between the tow bar and the cross member allowing a greater portion of the trailer weight to be accommodated at the traverse axle and tires. Lastly, a spare tire mount is bolted to the apertures of the top portion of the tow bar. The spare tire mount supports a spare tire above the tow bar and the gusset bars attached to the tow bar.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved trailer towing device which has all of the advantages of the prior art towing trailers and none of the disadvantages.

It is another object of the present invention to provide a new and improved trailer towing device which may be easily and efficiently manufactured and marketed.

It is further object of the present invention to provide a new and improved trailer towing device which is of durable and reliable constructions.

An even further object of the present invention is to provide a new and improved trailer towing device which is susceptible of a low cost of manufacture with regard to both materials and labor, and which accordingly is then susceptible of low prices of sale to the consuming public, thereby making such trailer towing device economically available to the buying public.

Still yet another object of the present invention is to provide a new and improved trailer towing device which provides in the apparatuses and methods of the prior art some of the advantages thereof, while simultaneously overcoming some of the disadvantages normally associated therewith.

Even still another object of the present invention is to provide a trailer towing device capable of reducing the trailer tongue weight that is applied to a vehicle bumper when a trailer hitch is coupled to the bumper for towing by the vehicle.

Lastly, it is an object of the present invention to provide a new and improved trailer towing device including an axial tow bar that has a front end, a rear end and top portion with a plurality of apertures. A socket hitch is coupled to the front end of the tow bar, and has a tow ball gripping catch for securing the socket hitch to a tow ball of a vehicle bumper. A cross member is attached to the rear end of the tow bar. A traverse axle is in contact with the inner surface and within the channel of the cross member. The traverse axle has a pair of axle adaptors fixedly attached to the top thereof. The traverse axle supports the tires. A reinforcing plate is attached to the upper surface of the cross member, and has a junction box and a hitch ball head post. Lastly, a pair of gusset bars, with one end of each gusset bar fixedly attached to the tow bar, while another end of each gusset bar is fixedly attached to the cross member. The pair of gusset bars provide axial rigidity between the tow bar and the cross member, when the traverse axle is within the cross member.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
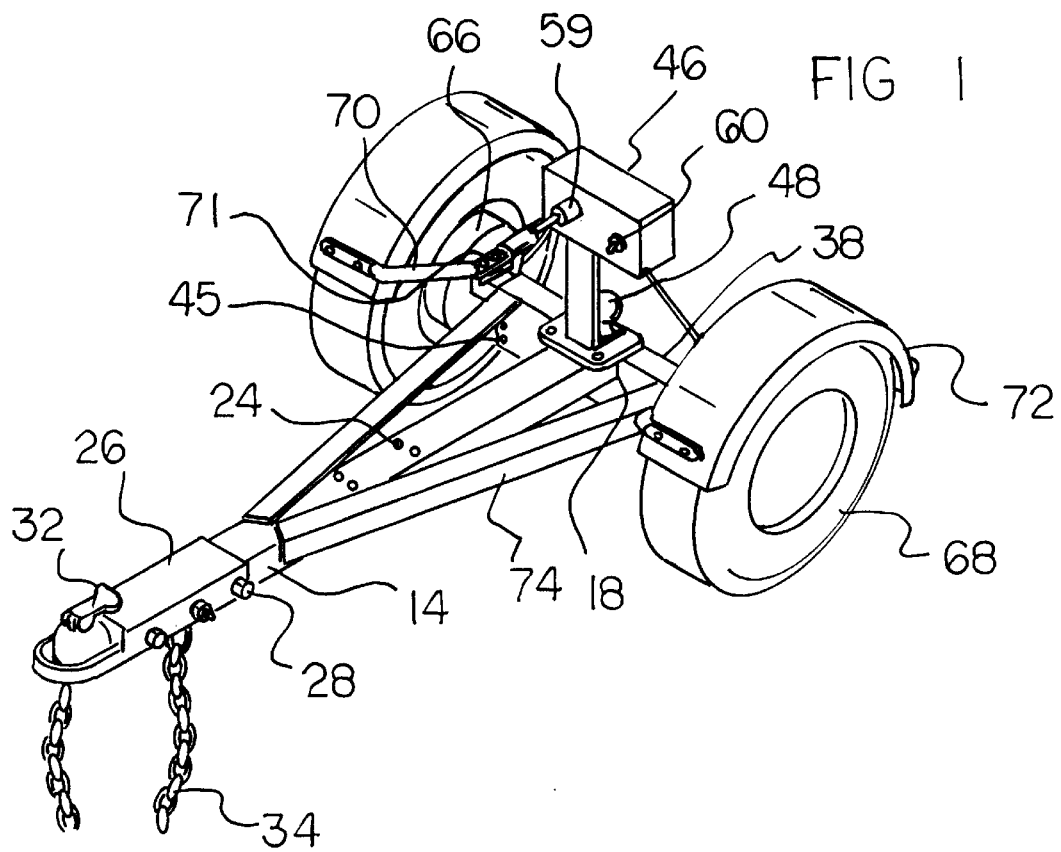
FIG. 1 is a perspective view of the preferred embodiment of the trailer towing device constructed in accordance with the principles of the present invention.

With reference now to the drawings, and in particular to FIG. 1 thereof, the preferred embodiment of the new and improved trailer towing device embodying the principles and concepts of the present invention and generally designated by the reference numeral 10 will be described.

The present invention, the trailer towing device 10 is comprised of a plurality of components. Such components in their broadest context include a tow bar, a socket hitch, a traverse axle and a pair of gusset bars. Such components are individually configured and correlated with respect to each other so as to attain the desired objective.

Specifically, the present invention includes a rigid axial tow bar 14. The tow bar has a front end 16, a rear end 18 and top portion 20. The tow bar is formed of a tapered steel channel three inch wide, one and one half inches deep at the front, and five and one half inches deep at the rear. The top portion has a plurality of apertures 24 therethrough with the apertures mid-way the front end and the rear end. The tow bar, as shown in FIG. 1, has a length of about twenty-four inches to about ten feet.

Figure 2:
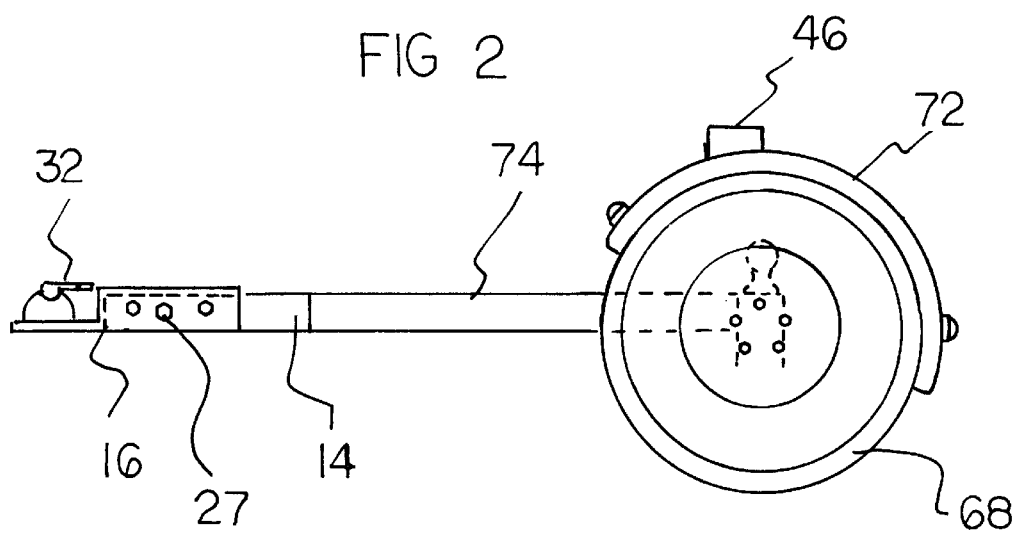
FIG. 2 is a side elevational view of the device illustrated in FIG. 1.

Also, a socket hitch 26 is bolted to the front end 16 of the tow bar by four steel bolts 28. The four bolts that secure the socket hitch to the front end of the towing bar are torqued. The socket hitch, as seen in FIG. 1, has a tow ball gripping catch 32 and a chain 34. The chains are attached by a fifth bolt 27 that passes through both sides of the hitch. The fifth bolt is not torqued. The socket hitch is capable of being attached to a tow ball of a vehicle bumper, while the chain is couple to the bumpers bottom. The catch, as shown in FIG. 2, when in the down position, is capable of securing the socket hitch onto the tow ball of the vehicle. The socket hitch is a standard commercially available socket trailer hitch that is readily attached to the tow ball.

Figure 4:
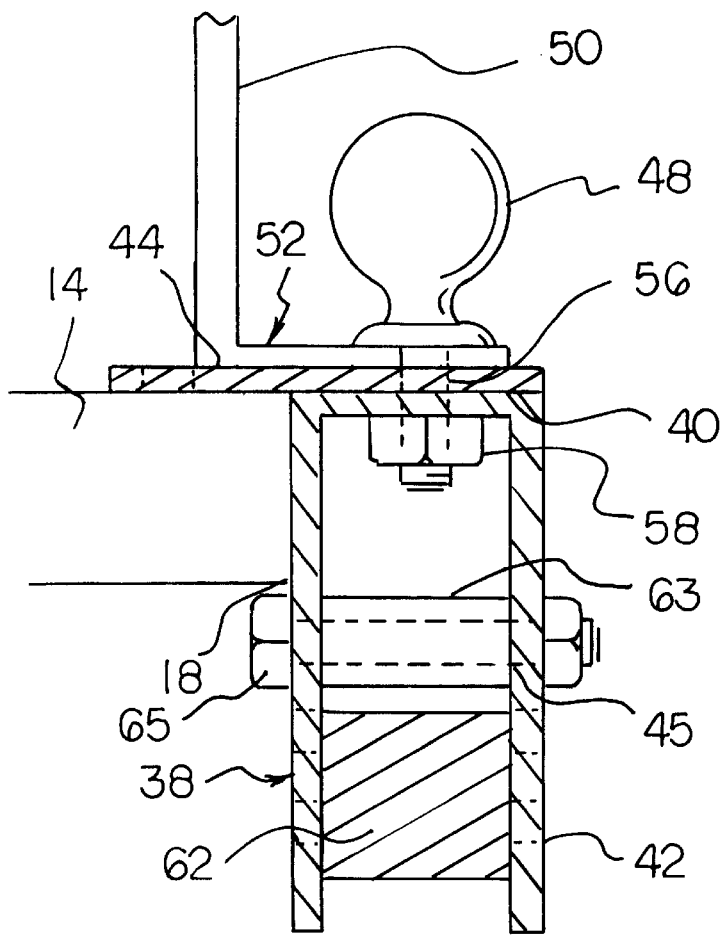
FIG. 4 is a fragmentary cross sectional view of the invention taken along line 4—4 of FIG. 3.
Figure 5:
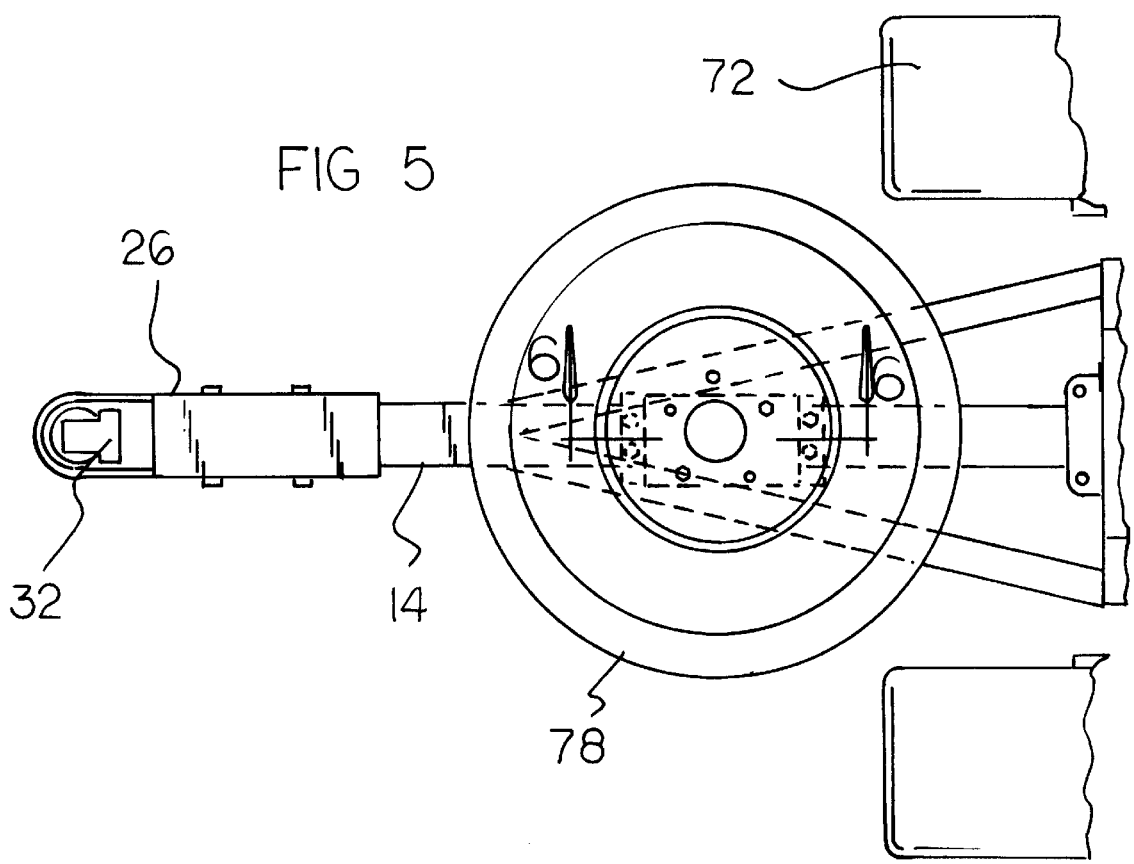
FIG. 5 is a fragmentary top view of the present invention depicting the spare tire attachment.

As best illustrated in FIG. 4, a deep channel rigid cross member 38 is fixedly attached to the rear end 18 of the tow bar. The cross member is steel and welded to the tow bar. The cross member has an upper surface 40 and an inner surface 42. The cross member has a reinforcing plate 44 fixedly attached to the upper surface. The reinforcing plate is welded to the cross member and the top portion of the tow bar 14 simultaneously. The cross member has a plurality of holes 45 punched through and adjacent each end edge, with groups of five being along each end edge. In FIG. 1, two of the five holes may be seen.

The cross sectional view in FIG. 4 shows the other three holes. One set of five holes, on one adjacent end edge of the cross member, are in axial alignment with another set of five holes on another adjacent end edge of the cross member. The plurality of holes are for height adjustment of the present invention. The cross member and the tow bar, when welded together, form a T-shaped frame which is the backbone of the trailer towing device.

Additionally, the reinforcing plate 44, as shown in FIG. 4, has a junction box 46 supported on it by a mount 50, and a hitch ball headpost 48 mounted. The mount is a flat piece of steel with two 90 degrees bends forming an upper flang and a lower flang. The upper flang is not shown, but is coupled to the junction box. The lower flang or base 52 of the mount sits on top of the reinforcing plate. The base 52 of the mount supporting the junction box, is held in place by a shank of the hitch ball.

The reinforcing plate has two front holes for receiving safety chains to hook into at both sides ahead of the cross member. The shank of the hitch ball is positioned through an opening 56 in the reinforcing plate and the cross member, after passing through the base. The hitch ball is then secured with a nut 58.

The junction box is capable of coupling with the power source of the vehicle when the socket hitch 26 is positioned on the vehicle bumper. The junction box transfers power from the vehicle to a trailer that is mounted onto the hitch ball of the cross member. The junction box houses wiring for the lights and the brakes of the trailer device. The power cord 59 enters the front of the box, as seen in FIG. 1. A toggle switch 60 is mounted in the front of the box to turn the brakes off when the invention is in tow without a trailer being supported by it. The back of the box has three car plugs (not shown). The plugs will receive the three most popular size vehicle trailer cords.

Figure 3:
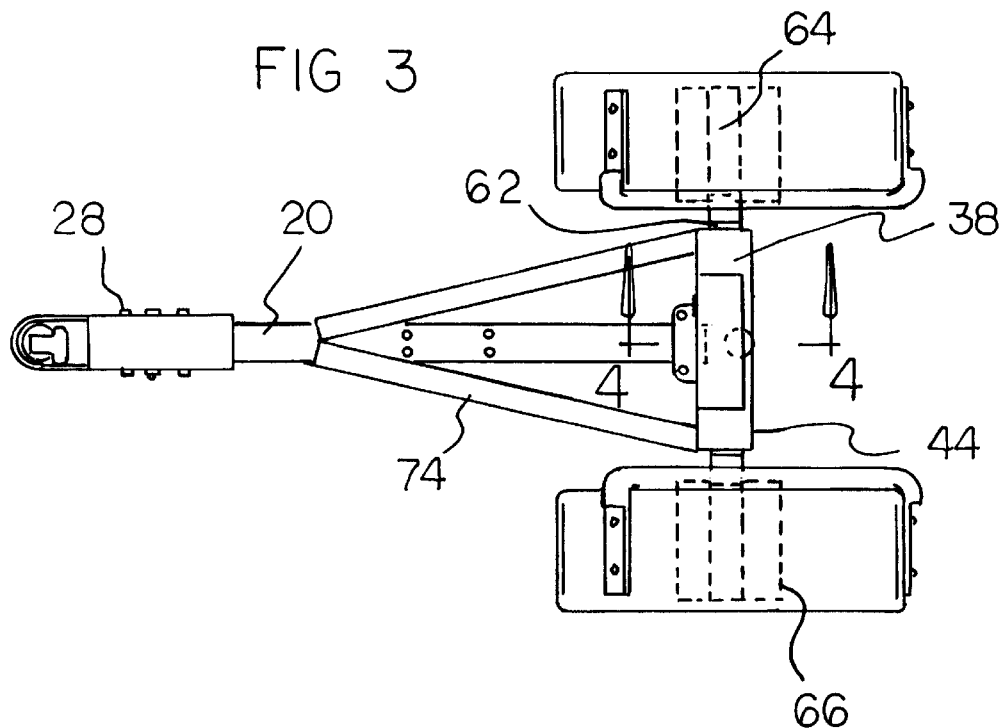
FIG. 3 is a top plan view of the apparatus constructed in accordance with the teachings of the present invention.

Included is a traverse axle 62, as seen in FIG. 3. The traverse axle is a single piece axle, with electric brakes coupled to each axle end. The traverse axle is positioned within the channel of the cross member 38, as seen in FIG. 4. The traverse axle is in contact with the inner surface 42 of the cross member 38. A pair of axle adaptors 63 are welded to the top of the traverse axle. FIG. 4 shows one of the axle adaptors having a bolt 65 passing through the adaptor and the holes 45 of the cross member.

Additionally, the height of the traverse axle, within the cross member, may be adjusted by coupling the axle adaptor with any of the axially matching holes of the cross member. The traverse axle has a length of between 36 inches to 60 inches. The cross member will be structured to have a length that matches the length of the traverse axle. The traverse axle is made of a 2 inch square steel tubing. The heavier duty commercial devices will have either two and one half inch or three inch square tubing axles. For these bigger axles, the cross member will be made wider to fit the axle and the axle adaptor will also be made wider. The traverse axle has coupled to each end a hub 64 and a drum 66. The hub and drum are each capable of supporting a tire 68. The hub, bolt circle and wheel pattern, coupled to the traverse axle of the present invention, may match identical components of the tow vehicle or the trailer being towed.

Furthermore, the traverse axle has a pair of fender brackets 70 with one each attached to a fender bracket support 71. The fender bracket support is welded to a break flange (not shown). The fender bracket is made of a round tubular steel, with two 90 degree bends and one 45 degree bend. A brace at the center will fasten to the axle bolt and to the fender for stability. Each fender bracket supports a fender 72 above the tire coupled to the hub.

Lastly, a pair of gusset bars 74 are provided. As seen in FIG. 3, one end of each gusset bar is fixedly attached to the tow bar 14, and another end of each gusset bar is fixedly attached to the cross member 38 at an outer edge. The one end of each gusset bar is six inches from the front end 16 of the tow bar 14. Each gusset bar is made of steel and has a length proportional to the length of the tow bar and cross member. The length of each gusset bar is dependant on the length of the cross member.

The pair of gusset bars are capable of providing axial rigidity between the tow bar and the cross member 38, when the traverse axle 62 is secured within the channel of the cross member. Each gusset bar reinforces the welds at the junction of the cross member and tow bar. The axle rigidity allows the socket hitch to resist swing when mounted to the tow ball of the vehicle and the trailer is mounted to the hitch ball. The axle rigidity between the tow bar and the cross member, allows a greater portion of the trailer weight to be accommodated at the traverse axle and tires.

The device of FIGS. 1–6 is structured to act as an intermediate trailer support. The device relieves the problem of the weight of trailers adversely effecting the stability of the vehicle that is towing. The device does this by allowing a greater portion of the trailer weight to be transferred to the traverse axle and the tires. Equally important, the trailer and the vehicle are no longer coupled in pitch, and rotational movement of the trailer relative to the vehicle is accommodated by the pivotal movement about the hitch ball 48 that is attached to the cross member 38.

Figure 6:
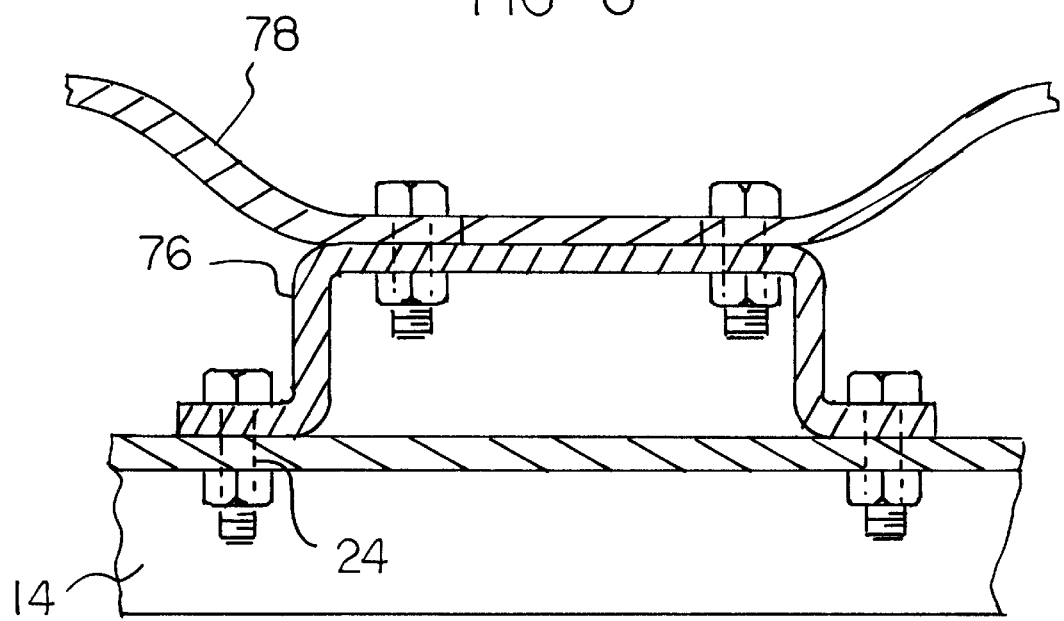
FIG. 6 is an enlarged fragmentary view of the wheel support bracket taken along line 6—6 of FIG. 5.

Finally, a spare tire mount 76 is bolted to the apertures 24 of the tow bar as shown in FIG. 6. The spare tire mount supports a spare tire 78 above the tow bar 14 and the gusset bars 74. The spare tire may be used in the event one of the tires is damaged in some way.

The present invention is an improved trailer towing device for receiving the trailer hitch weight and acting as an intermediate between the towing vehicle and the trailer. The present invention provides the driver with the trailer hitch being towed a much less tense drive than generally expected. The device is structured to remove the trailer tongue weight from the bumper hitch of the towing vehicle. All of the swing of the trailer, that is transmitted to the towing vehicle through the hitch, will be eliminated.

The user can tow safely using a variety of all-terrain vehicles or passenger cars and will no longer need to buy a truck. The device could effectively convert a travel trailer mobile home or utility to a four wheel trailer. The present invention provides a steady ride, weight carrying ability device that will not bend bumpers down from the weight, nor cause the rear end of the vehicle to bottom out. The present invention completely eliminates the danger of the trailer controlling the towing vehicle. The device also increases braking power As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved trailer towing device for receiving trailer hitch weight comprising in combination:

a rigid axial tow bar having a front end, a rear end and a top portion therebetween, the top portion having a plurality of apertures therethrough and midway the front end and the rear end;

a socket hitch being bolted to the front end of the tow bar by four steel bolts that are torqued, the socket hitch having a tow ball gripping catch and chain, the socket hitch attaching to a tow ball of a vehicle bumper while the chain couples the bumper's bottom, the catch securing the socket hitch onto the tow ball of a vehicle;

a deep channel cross member being fixedly attached to the rear end of the tow bar, the cross member having an upper surface and a inner surface, the cross member having end edges with a plurality of holes punched through the cross member and adjacent the end edges, the plurality of holes forming groups of five holes being along each end edge, one set of the groups of five holes on one adjacent end edge of the cross member are in axial alignment with another set of the groups of five holes on another adjacent end edge of the cross member, the cross member having a reinforcing plate being fixedly attached to the upper surface thereof and the top portion of the tow bar simultaneously;

the reinforcing plate having a junction box and a hitch ball head post mounted thereon, the reinforcing plate having a mount that supports the junction box, the mount having a lower flange seated on the reinforcing plate and held in position by the hitch ball, the junction box being coupled with a power source of the vehicle when the socket hitch being positioned on the vehicle bumper, the junction box transfers power from the vehicle to a trailer being mounted onto the hitch ball of the cross member;

a traverse axle being a single piece axle in contact with the inner surface and within the channel of the cross member, the traverse axle having a pair of axle adaptors fixedly attached to a top thereof, each axle adaptor securing the traverse axle within the cross member, the position of the traverse axle within the channel being adjusted by coupling each of the pair of axle adaptors with the respective axially aligned holes of the groups of five holes along each end edge of the channel, the traverse axle being coupled to a hub and a drum, the hub and drum each supporting a tire;

the junction box housing wires for use with the trailer mounted onto the hitch ball, a power cord enters the front box, and a toggle switch being mounted on the box for powering brakes of the drum of the traverse axle;

a pair of gusset bars with one end of each gusset bar being fixedly attached to the tow bar, and another end of each gusset bar being fixedly attached to the cross member, the pair of gusset bars providing axial rigidity between the tow bar and the cross member when the traverse axle being bolted to the cross member, the axial rigidity allows the socket hitch to resist swaying when mounted to the tow ball of the vehicle and the trailer mounted to the hitch ball, the axial rigidity between the tow bar and the cross member allowing a greater portion of the trailer weight to be accommodated at the traverse axle and tires; and a spare tire mount being bolted to the apertures of the top portion of the tow bar, the spare tire mount supporting a spare tire above the tow bar and the gusset bars attached thereto.

* * * * *